United States Patent [19]
Findlay

[11] Patent Number: 5,165,317
[45] Date of Patent: Nov. 24, 1992

[54] MULTI-USE APPARATUS FOR THE CONTROL OF PORTABLE POWER TOOLS

[76] Inventor: Brian D. Findlay, 87 Queen Victoria St., Bexley, 2207, Australia

[21] Appl. No.: 536,659
[22] PCT Filed: Dec. 23, 1988
[86] PCT No.: PCT/AU88/00499
§ 371 Date: Jun. 20, 1990
§ 102(e) Date: Jun. 20, 1990
[87] PCT Pub. No.: WO89/05714
PCT Pub. Date: Jun. 29, 1989

[30] Foreign Application Priority Data
Dec. 24, 1987 [AU] Australia ............... PI 6087

[51] Int. Cl.$^5$ .............................. B26D 5/08
[52] U.S. Cl. ......................... 83/574; 83/468; 83/468.3; 83/468.5; 83/471.3; 144/253 R; 144/286 R; 144/285
[58] Field of Search ................. 83/522.25, 468, 468.1, 83/468.2, 468.3, 468.5, 471.2, 471.3, 574; 144/253 R, 285 R, 286 R, , 286 A, 287

[56] References Cited
U.S. PATENT DOCUMENTS

| | | | |
|---|---|---|---|
| 2,513,497 | 7/1950 | Laughlin | 83/522.25 |
| 2,630,146 | 3/1953 | VanTuyl | 83/471.3 |
| 2,818,892 | 1/1958 | Price | 83/471.3 |
| 3,368,594 | 2/1968 | Drumbore | 83/471.3 |
| 3,384,135 | 5/1968 | Frydenlund | 83/471.3 |
| 4,155,383 | 5/1979 | Welliver | 83/574 |

Primary Examiner—W. Donald Bray

[57] ABSTRACT

A portable machine tool device (1) which may be transported in knocked down form in a substantially flat case. In assembled form the device (1) includes a support frame (8) and a swinging parallelogram linkage frame (9) which pivots about a rear edge of the support frame (8) and can be locked in any radial orientation by clamp (20) at the front edge of the support frame (8). The front edge of the support frame (8) includes a rectangular protractor scale (28) which reads off the radial angle of the frame (9) relative to the central position of the support frame (8). A machine tool is secured and independently locked or allowed to slide longitudinally and transversely in a carriage (38) which itself can longitudinally slide along or be locked to the upper rails (31) or the frame (9). The frame (9) itself can be rigidly locked to or slide at a constant radial direction, relative to the support frame (8). The height of the machine tool held in holder (38) above the support frame (8) is controlled by turning handle (35) connected to threaded bar (34) so as to alter the angle of the end plate (33) relative to the lower rails (30) of the frame (9).

13 Claims, 15 Drawing Sheets

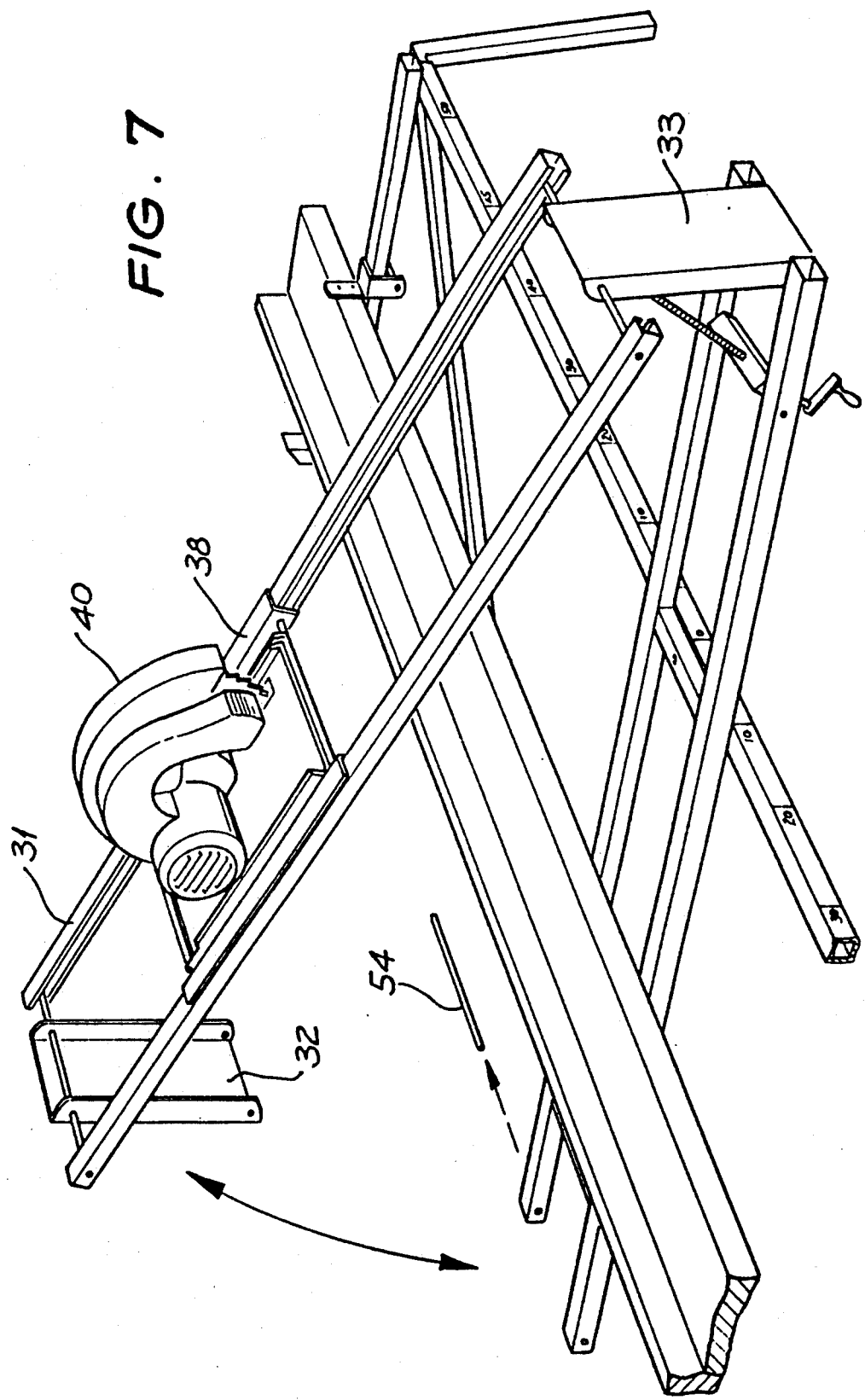

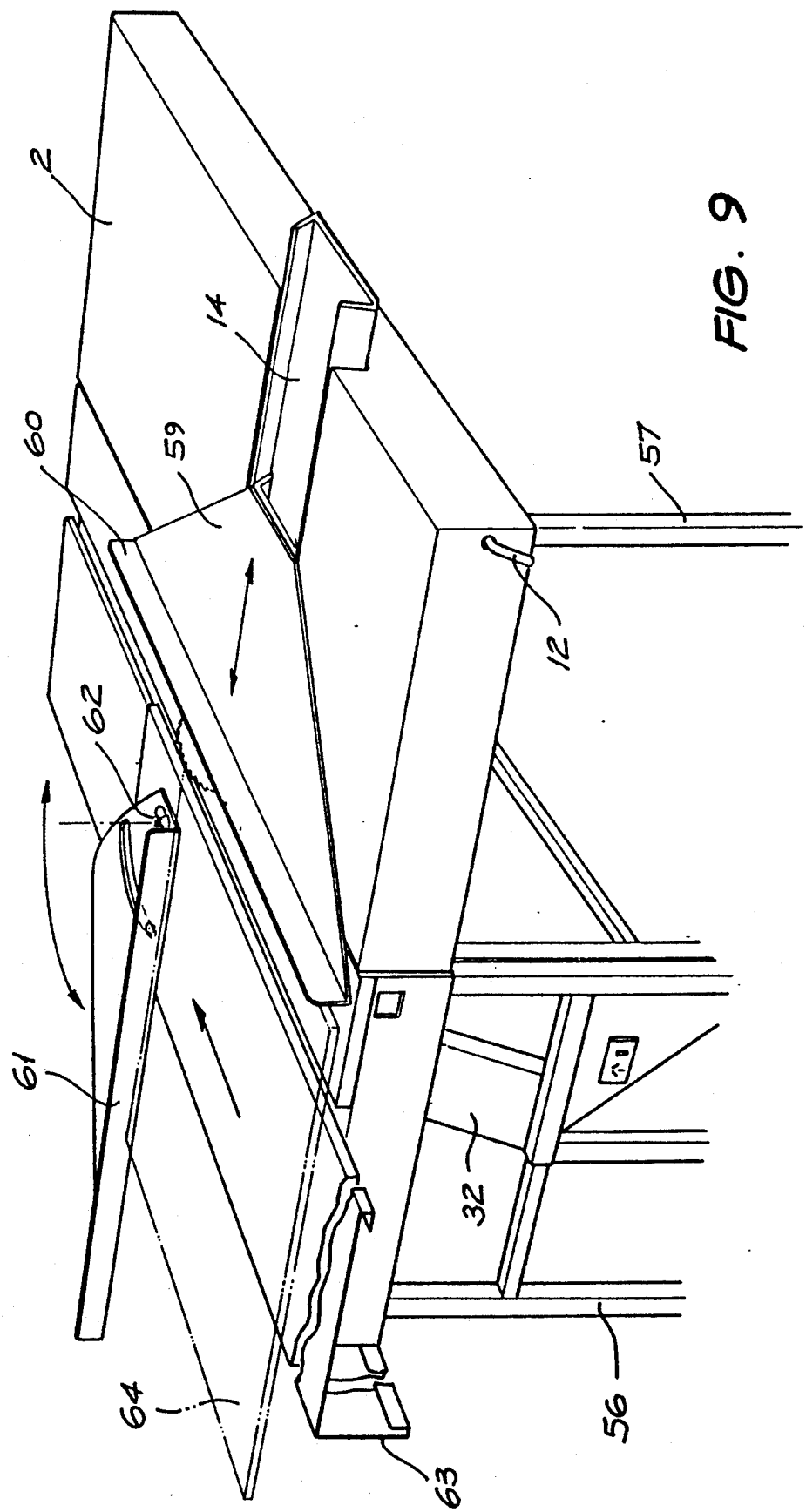

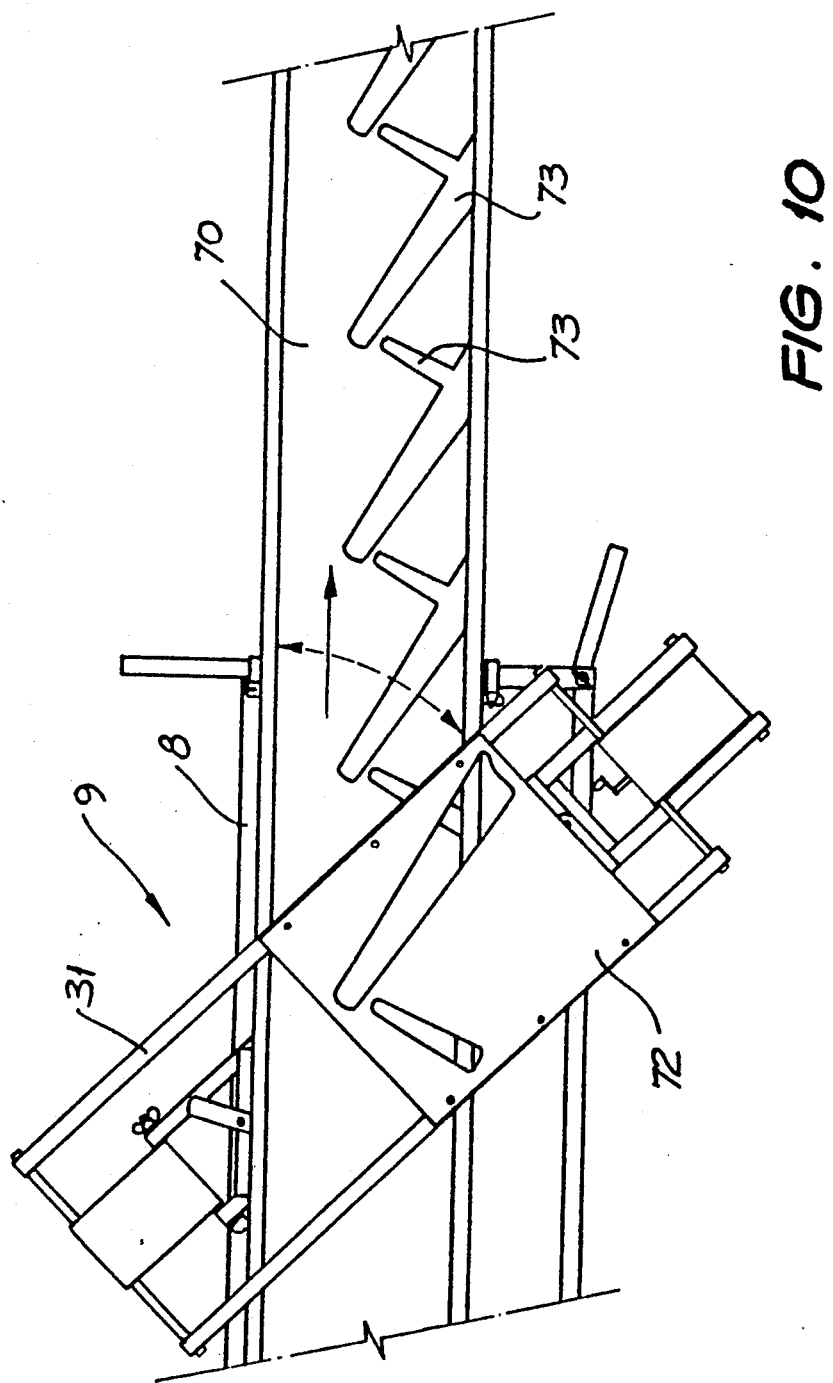

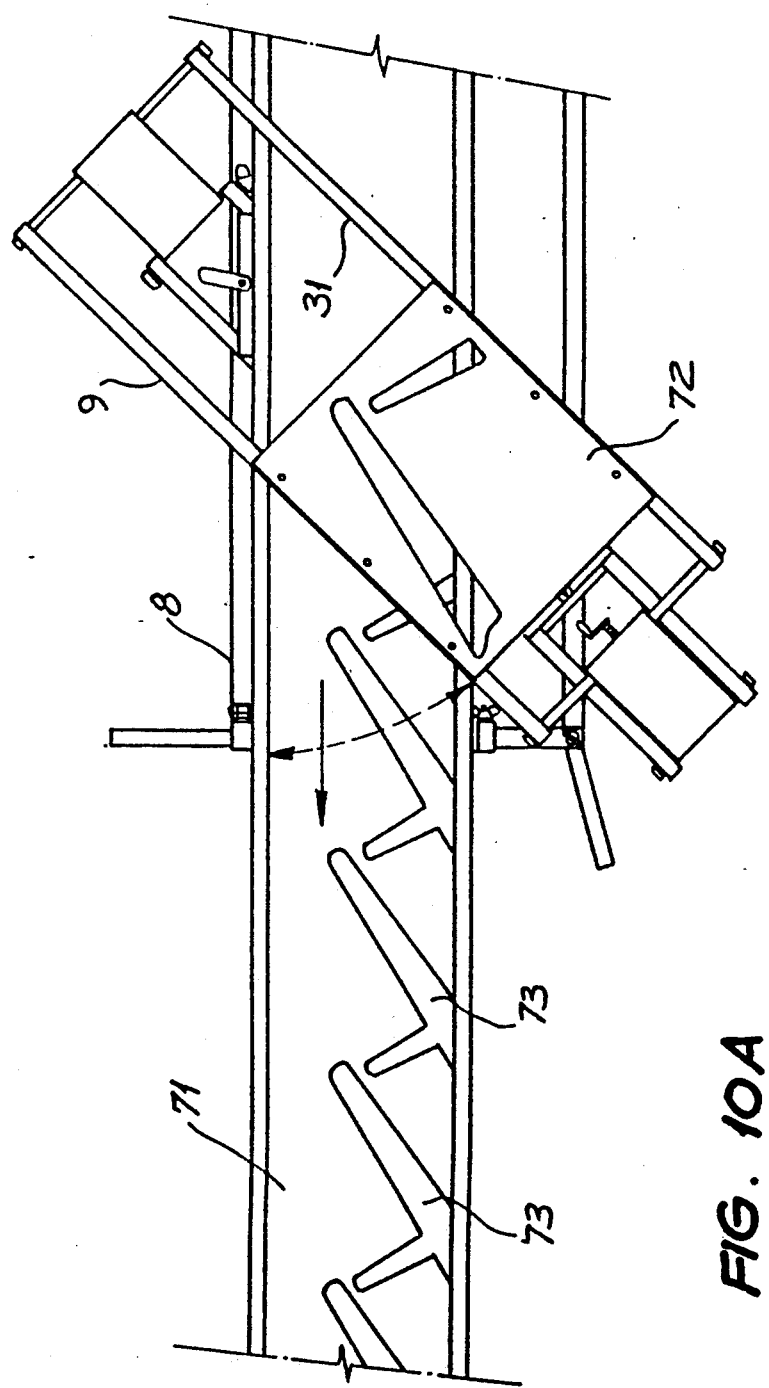

5,165,317

MULTI-USE APPARATUS FOR THE CONTROL OF PORTABLE POWER TOOLS

BACKGROUND ART

The present invention relates principally to multi-use apparatus for the control of portable power tools and to machine tools of similar function. Such power tools include for example, circular saws, routers, portable drill presses and sabre or jig saws. The invention finds use in all overhead radial applications (and other planes for example, vertical) and by use of a bench top converts to a fully functional table/rip saw, panel detail sizing saw, light spindle moulder and/or table sabre or jig saw.

Australian Patent Specifications 49665/79 and 499634 disclose apparatus that allow for example, a saw to be used in the overhead (work from above) application. Neither of these devices allow the tool used to function in a radial manner about the workpiece, instead, requiring the workpiece to be radially presented to the device at a required angle for the selected operation. Alternatively, it is necessary to relocate the entire device to the required angle. Both of these actions are very inconvenient when cutting varied angles on longer length material requiring support at both ends, especially when working to a length stop. Further, neither of these devices provide an accurate means by which the height of the power tool can be variably and finely controlled while maintaining a level attitude to a workpiece.

Another problem existing in radial devices of this nature is that reliably accurate angle selection is almost impossible to achieve with just one setting for two reasons.

One reason is the design usually incorporates a relatively small protractor, resulting in the marks indicating degrees being very closely spaced. Consequently, an almost imperceptible inaccuracy can be quite unacceptable at a point further from the point of axis and if applied, for example, to a rectangular frame with mitred corners that inaccuracy is then multiplied by the eight cuts required. Obviously the problem is further compounded when the point of axis becomes even slightly worn, because of the short radius to the set markings. The second contributing factor to this problem is in accurately relating the selected angle to the workpiece support and in turn, the workpiece to be cut. This problem is also due to the design, the front to rear orientation of existing devices of this nature causes the transverse location of the workpiece support in relation to angle setting to be governed over too short a span. (Ideally, accurate angle settings are better achieved if both arms of the angle are of equal length and the reading is taken as far as possible from the point of axis along one arm).

A further disadvantage with existing radial devices of this nature is that when it is desirable to present the cut from either edge of the workpiece at an adjustable amount and/or angle it cannot be done with convenience and/or safety. When such a variable presentation is required, it is necessary to end invert the workpiece for the desired cut. This is often undesirable and inconvenient.

There are many situations where an accurately adjustable width of cut would be highly desirable and a part remedy to this situation is available in the form of variable width trenching heads and "drunk" or "wobble" saws, as well as routers having whatever size cutter but if a number of cuts are needed that are to be wider than the maximum width setting of whatever type cutter is available there is no option with existing radial equipment except to relocate the material to the cutter again to increase the cut by the required amount. This is invariably inaccurate and inconvenient.

And further with existing prior art, when required, there is no convenient and automatic method of ensuring that such cuts or trenches are spaced evenly and accurately.

It has long been accepted by those needing to cut large panels that a reliably guided ripping and cross cutting capacity exceeding 1.2 meters is a virtual necessity but machines having these features are of considerable expense and not normally portable. This need is confirmed by the various methods used in trying to achieve these objectives at a relatively low cost. Australian Patent No. 499634, when inverted for use in the work from below configuration, as with other known devices, for example, table saws, is restricted by the size of the tabletop. To overcome this an extra table has been made available to extend the usable width for ripping of larger panels, consequently occupying considerable space in storage, transport and also when being used. There are other saw tables employing various methods of extending sections to accommodate this larger width of cut for ripping. However, none of these provide at low cost, a reliable and automatic realignment with the saw blade. Neither do they provide at low cost, an accurate method of guided crosscutting to 1.2 meters wide or more.

The machines that do have this crosscutting capacity normally employ a sliding table to guide the workpiece, being very acceptable but the method of design and construction has made the cost quite prohibitive to those not having a constant need for the function and is inherently heavy affecting portability. There are still others that make this function available in the form of an attachable kit still being quite expensive and inconvenient as well as affecting portability.

Further, with existing radial/table devices of this nature, size and shape are not suited to portability or being handled and setup by one man, as well as taking up considerable space in storage and/or transport.

The present invention provides a multi use power tool control apparatus that seeks to substantially overcome or lessen these disadvantages and preferably is incorporated in a compact quick knockdown and fold up portable form.

DISCLOSURE OF INVENTION

According to one aspect of the invention there is provided a machine tool device including a workpiece support frame adapted to support a workpiece in a working plane, a machine tool support frame adapted to support an attached machine tool for relative longitudinal sliding movement parallel to the working plane, said machine tool support frame being pivotally attached to the workpiece support frame about a pivot point at a first side of said workpiece support frame so that said machine tool support frame can be swung about the pivot point within the working plane.

In another form of the invention there is provided a machine tool work table including a ripping guide or fence being secured substantially perpendicularly to a first dovetailed section that is slidably and lockably mated to a further dovetailed section guide being located and secured substantially perpendicular to an intended line of feed of said machine work table so as to provide a range of distance settings between the fence and an operative member of an attached machine tool.

In another form of the invention there is provided a machine tool device work table including a sliding table section of sheet material formed to include two substantially perpendicular sections each of sufficient width to impose rigidity in the table section and the table section being supported and linearly slidably guided by mating guides extending the full length of said table section.

In another form of the invention there is provided a machine tool table device including a machine tool table bench top defined by a two part folding case adapted to contain components of the machine tool table when knocked down for transport or storage, the case being openable to a flat configuration so as to provide a substantially large flat surface and being fixed to the machine tool table when assembled for operation so that said surface forms a working surface of the table.

It will be apparent from the following detailed description that the preferred embodiment includes the following advantages:

(a) The radial setup with radial slide through of pivot point and variable height control with parallelogram and foldability;

(b) The angle selection system and its associated rectangular protractor giving a more accurate reading that increases accuracy with the sharpness of angle;

(c) As for (b), plus relating the workpiece support accurately to the angle selection system;

(d) The tool carriage which retains any popular size power tool and yet allows it to slide within the carriage which in turn can also slide as well longitudinally;

(e) As (d) but also with the ability to move sideways as well as lengthways; all by an adjustable amount and all while fully retained to give a fully adjustable rectangular cut that can be positioned as desired with repeatability;

(f) The ability to invert the power tool for use with a table/bench top with variable height control maintained;

(g) The table/bench top giving access to a larger work area when open, and yet still leaving the apparatus compact and portable when used as a case to enclose the apparatus.

(h) The dovetail controlled ripping guide when locked ensures correct alignment with the saw blade. It also locks from below the surface giving access to an end inversion that in turn can be telescopically extended beyond the much sought but difficult to achieve 1200 mm (or 4 ft) and still maintains secure alignment with the saw blade.

(i) The sliding table system being light, of low cost, strong and accurate allows straight edging and cross cutting of wide sheets of up to 1500 mm (and with the design of the end profile it is ideally suited to a telescopic insert to gain a further extended width/length of cut);

(j) The auto trench locator/work length stop, having the ability to maintain correct separations of trenches when operating. As well it can be connected to a measuring tape for fast settings and having micro adjustable zero when used as a work length stop; and (k) The ability for the device to incorporate a profile template at a controlled height above a workpiece at a precise angle and cross location for cuts of a desired profile as with a router for example. Particularly useful when used in conjunction with (J) if required at repeatedly set spacings as in FIGS. 10 and 10A (J) not illustrated.

BRIEF DESCRIPTION OF THE DRAWINGS

The preferred embodiment of the present invention will now be described with reference to the drawings in which:

FIG. 7 is a schematic perspective view illustrating the first steps in the conversion of the apparatus from the work from above configuration to the work from below configuration;

FIG. 9 is a perspective view of the apparatus of the preferred embodiment as used in the work from below configuration;

FIG. 10 is a plan view in the work from above configuration illustrating an alternative power tool mounting;

FIG. 10A is a view similar to FIG. 10 in opposite "hand";

BEST MODE OF CARRYING OUT THE INVENTION

Figure 1:
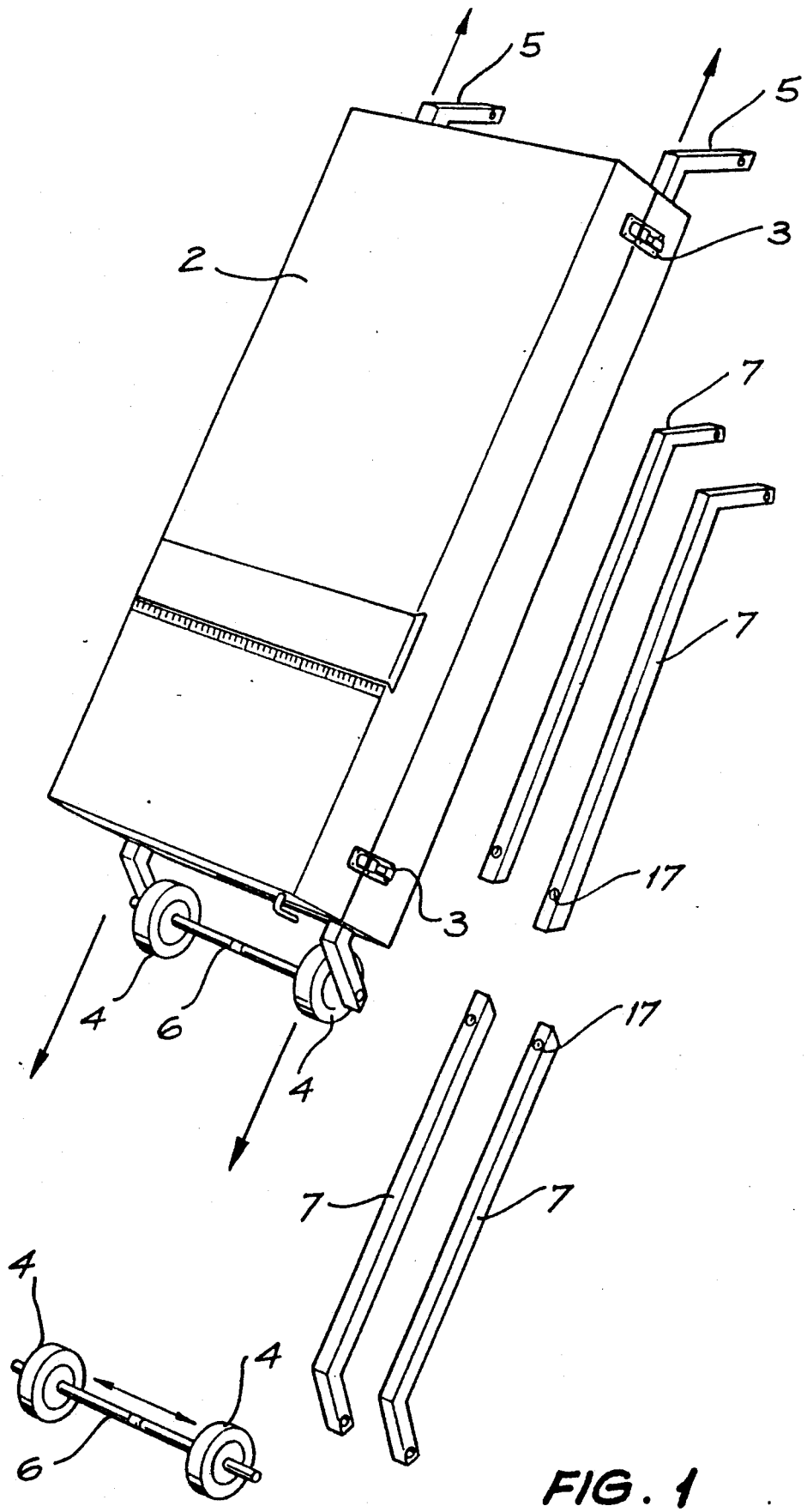
FIG. 1 is a perspective view of the apparatus in its dismantled condition and contained within a case.

As seen in FIG. 1, the apparatus 1 of the preferred embodiment is able, in its dismantled condition, to be located within a two part case 2 which is provided with a pair of locks 3. The case 2 is also provided with a pair of wheels 4 at one end and a pair of handles 5 at the other end. As schematically illustrated in FIG. 1, the axle 6 of the wheels 4 is longitudinally adjustable there by enabling the wheels 4 to be removed. As indicated by arrows in FIG. 1, the handles 5 and the supports for the wheels 4 are able to be removed from the case 2 and thereby constitute four legs 7.

Figure 2:
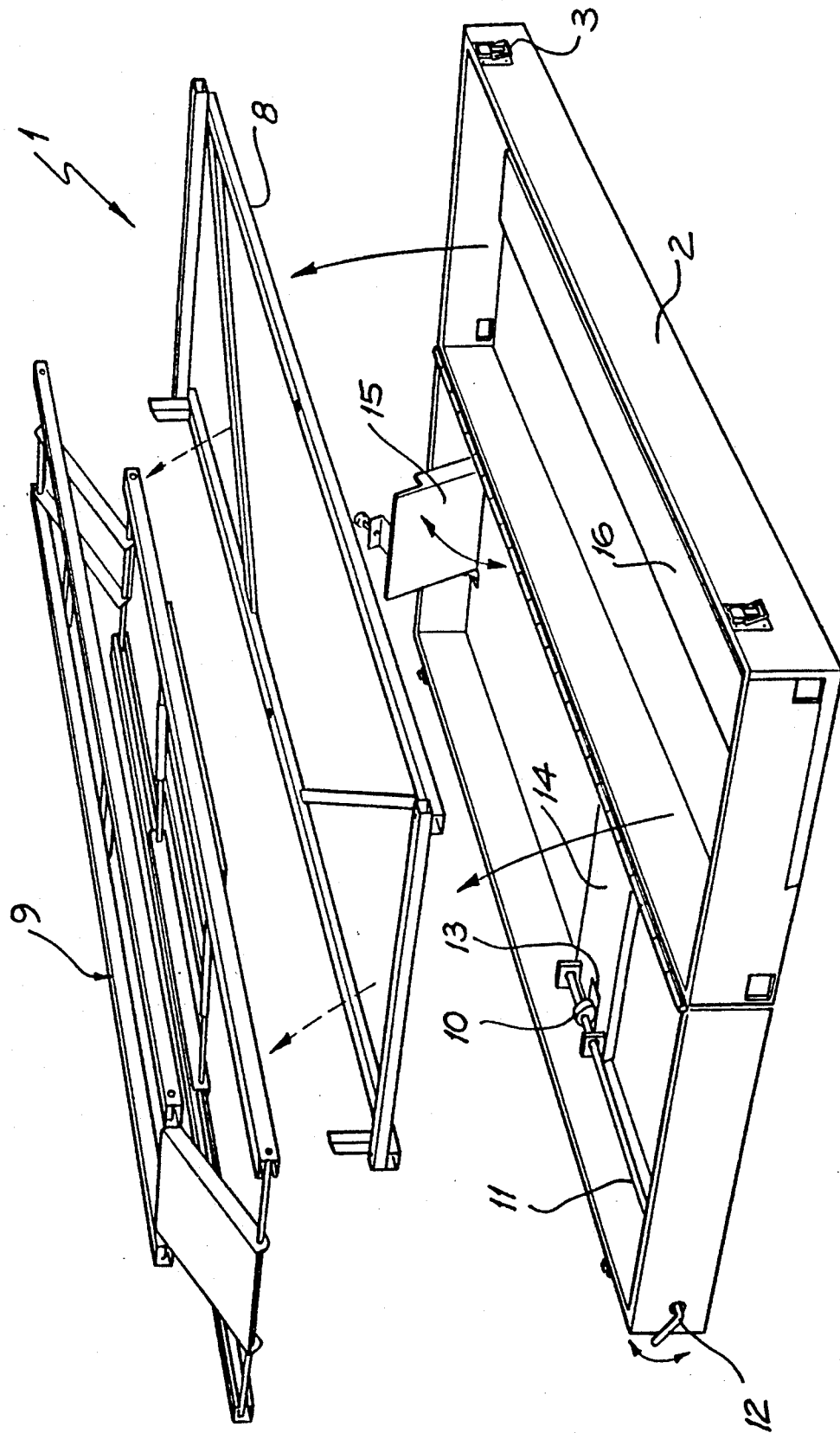
FIG. 2 is a simplified exploded perspective view of the case of FIG. 1 in its opened condition illustrating how various components of the apparatus are removable from the case.

As seen in FIG. 2, the case 2 is able to be opened into a planar configuration and the two major sub-components of the apparatus 1 are able to be removed from the interior of the case 2. These sub-components are a base support frame 8 and a parallelogram linkage sub-frame 9. Also located within the interior of the case 2 is a locking cam 10 which is fixedly mounted on a rotatable shaft 11 having a handle 12. The cam 10 is located over an opening 13 in a guide 14. Also located within the case 2 is a support plate 15. In the other half of the case 2 a longitudinally extending guide 16 is formed.

Figure 3:
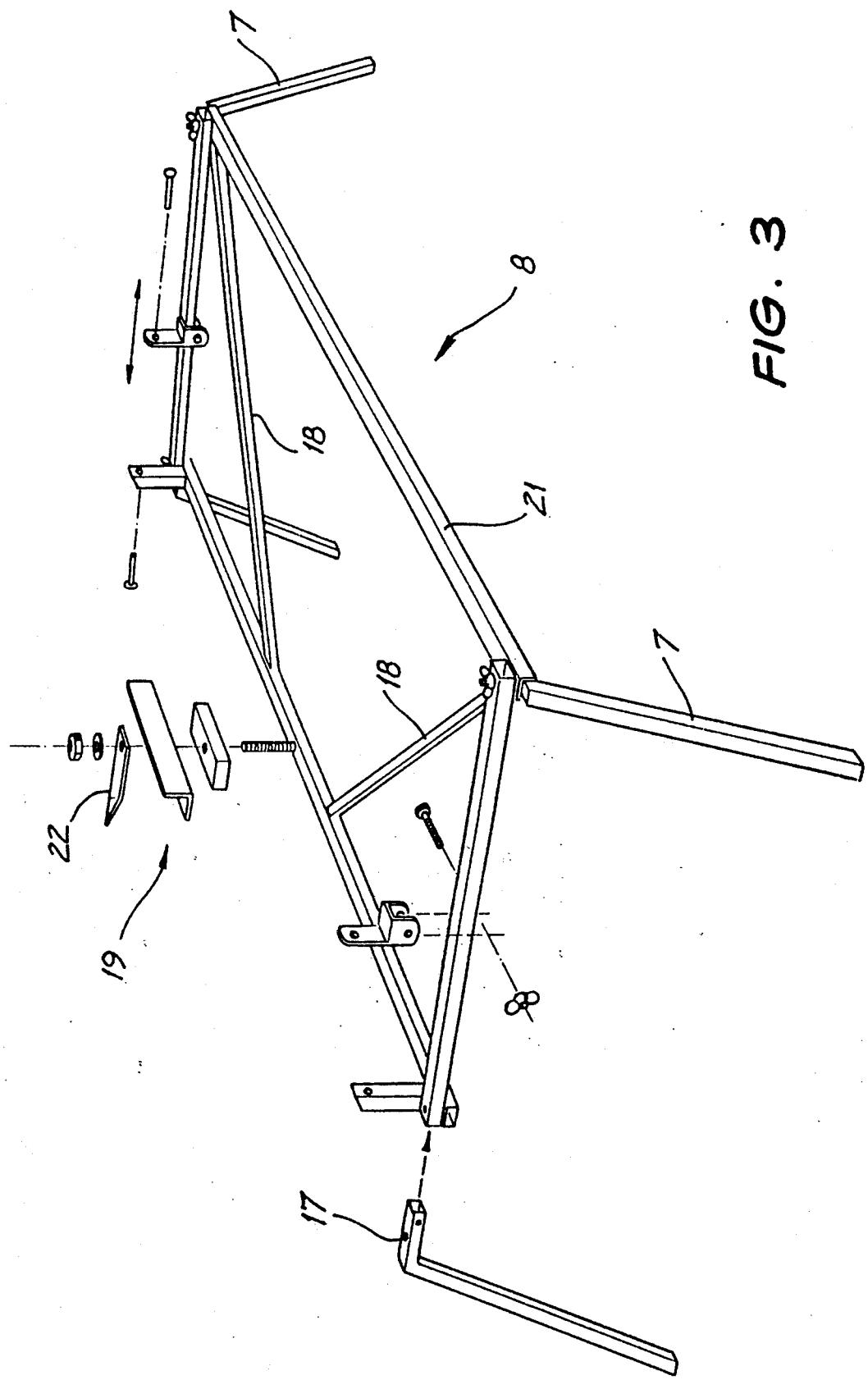
FIG. 3 is a perspective view of the base support frame of the preferred embodiment in a substantially fully assembled condition.

FIG. 3 illustrates the base support frame 8 in a substantially assembled condition in which the legs 7 are inserted into the hollow rectangular metal tubing of the frame 8 and releasably secured in place by any convenient conventional means such as spring pin catches 17 (FIG. 3). It will be appreciated that at each end of the frame 8, the legs 7 at the front extend somewhat outwardly and the legs 7 at the rear extend somewhat rearwardly thereby providing considerable stability. Further rigidity is given to the frame 8 by means of diagonal braces 18.

Centrally located at the rear of support frame 8 is a releasable clamp 19 which is illustrated in an exploded configuration.

Figure 3A:
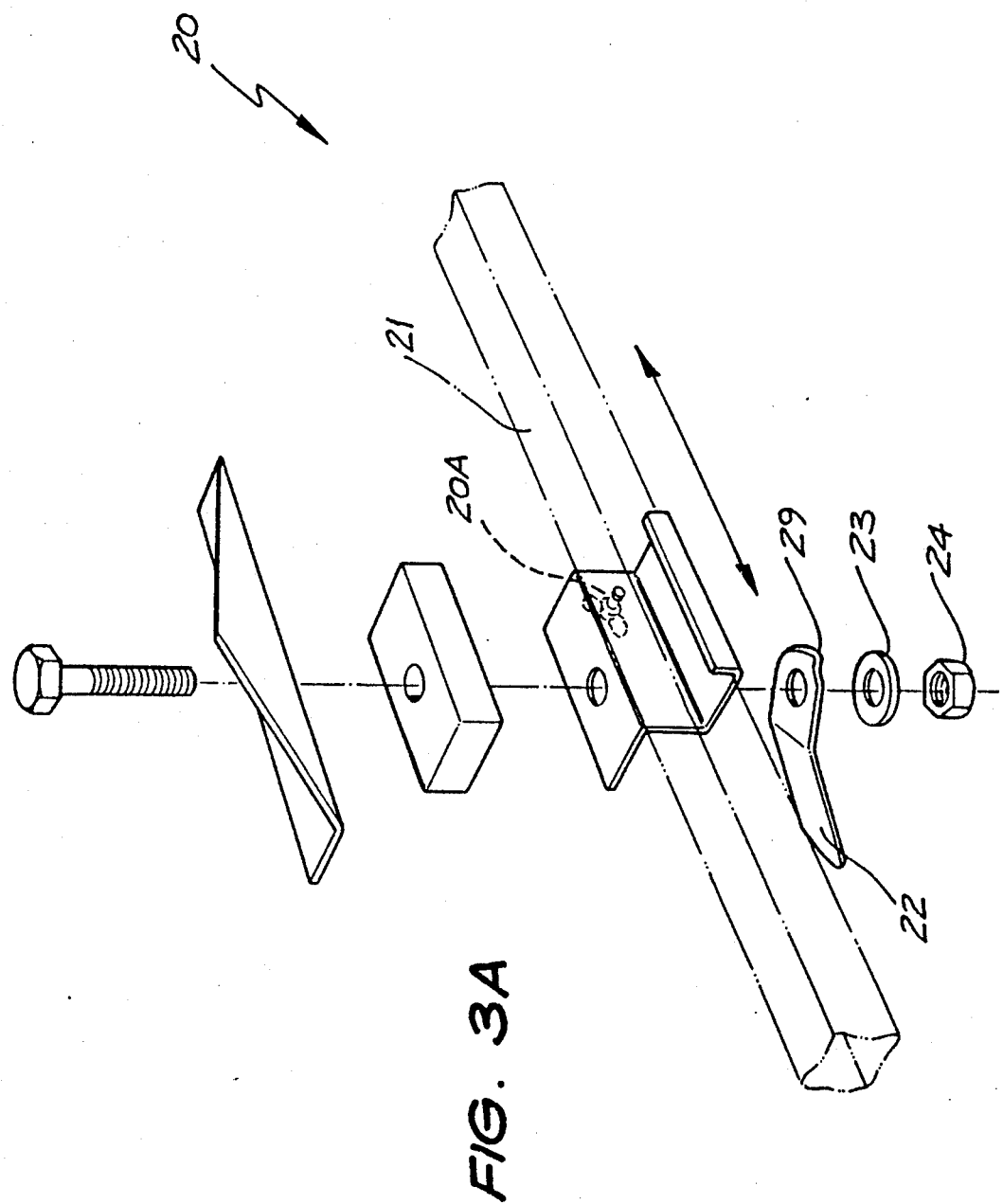
FIG. 3A is an exploded perspective view of a releasable clamp, used as a primary angle setting that allows longitudinal sliding of a tool carrier at a selectable set angle.

Also illustrated in exploded fashion in FIG. 3A is a further releasable clamp 20 which is able to be secured to the front cross-member 21 (FIG. 3) of the support frame 8. It will be appreciated that the releasable clamps 19 and 20 obtain their clamping action by means of hand operated turning levers 22 which have a portion 29 (FIG. 3A) adjacent the accompanying washer 23 which is distorted out of a flat condition. As a consequence turning the lever 22 can increase or decrease the effective thickness of the material under the corresponding nut 24 and thereby apply or release the clamp. But these could be locked by other methods such as proprietary line adjustable clamp levers.

Figure 4:
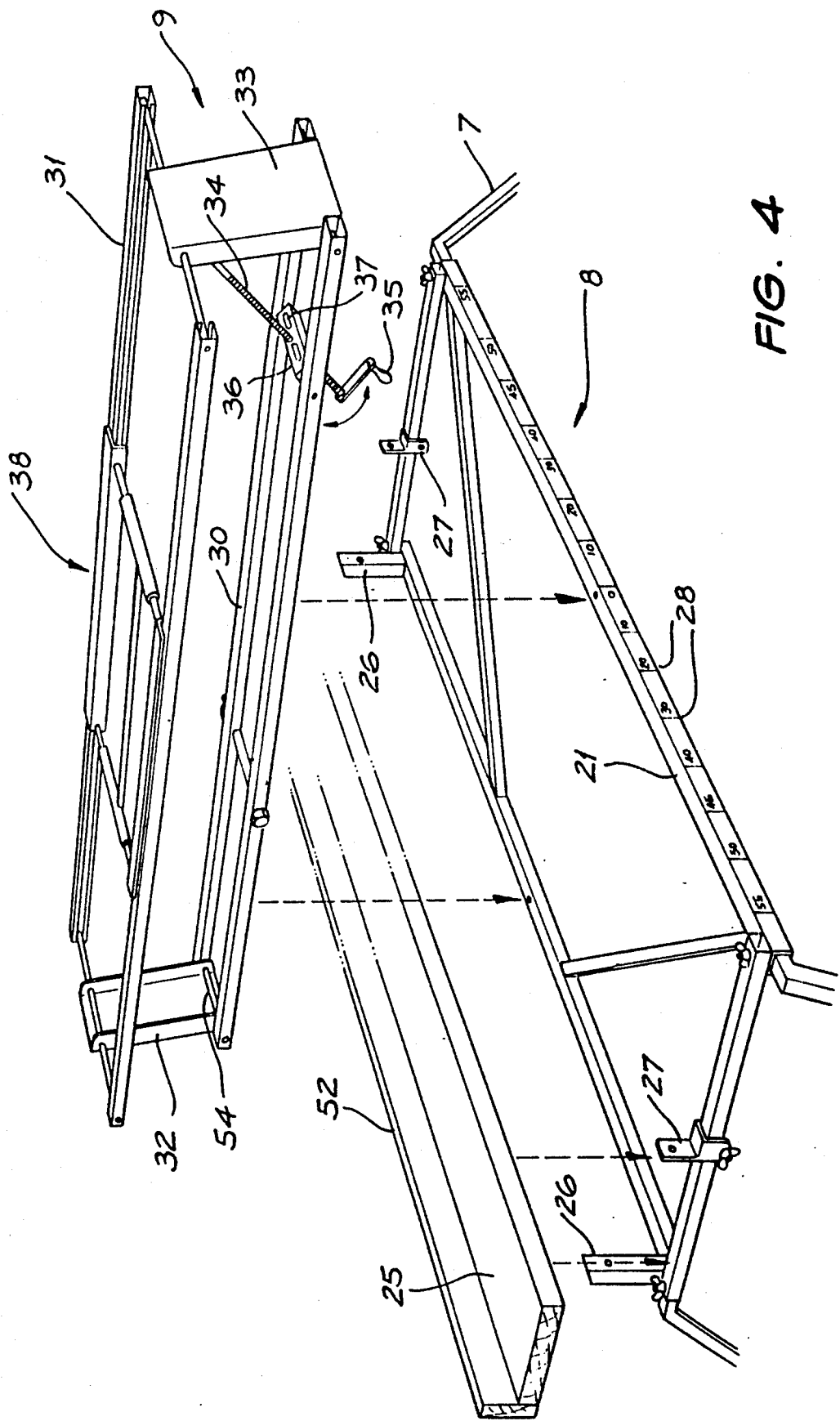
FIG. 4 is a perspective view of a mechanically variable parallelogram linkage frame of the apparatus which is able to be adjustably positioned on the support frame of FIG. 3.

As seen in FIG. 4, the parallelogram frame 9 is located on the support frame 8 and the clamps 19 and 20 hold the frame 9 in position as will be described hereafter. Furthermore, a support guide 25 of substantially L-shaped cross section is positioned on the support frame 8 between back rests 26 and front stops 27. As schematically illustrated in FIG. 4, the front cross-member 21 is preferably provided with markings 28 so as to indicate the angle of the parallelogram frame 9 relative to the support frame 8.

An alternative to the markings 28 is a conventional protractor (not shown) and a co-operative index marker (not shown) each fixed to one of the frame 8 and frame 9 so that rotation of the frame 9 relative to the frame 8 is shown by the index against the protractor.

Also illustrated in FIG. 4 is the parallelogram frame 9 which is formed from a pair of lower rails 30 and upper rails 31 which are pivoted at each end by linkages 32 and 33 which enable the spacing between the lower rails 30 and upper rails 31 to be variably controlled while still maintaining the rails 30, 31 parallel to each other. This control is by a threaded rod 34 rotatable by handle 35 and threadably engaged in a block 36 carried between the lower rails 30. The variably controlled height of the upper rails 31 is mechanically located at any desired position by the threaded engagement between the rod 34 and the block 36. The block 36 is located and secured by spring loaded detents 37 to enable the block 36 to be removed from between the lower rails 30 when it is intended to fully collapse the parallelogram frame 9.

In an alternative not illustrated the threaded rod 34 is releasably engaged with the block 36 so as to allow its quick release when folding down the parallelogram frame 9. Slidably mounted on the upper rails 31 is a carriage 38 to be described in more detail hereafter.

Figure 5:
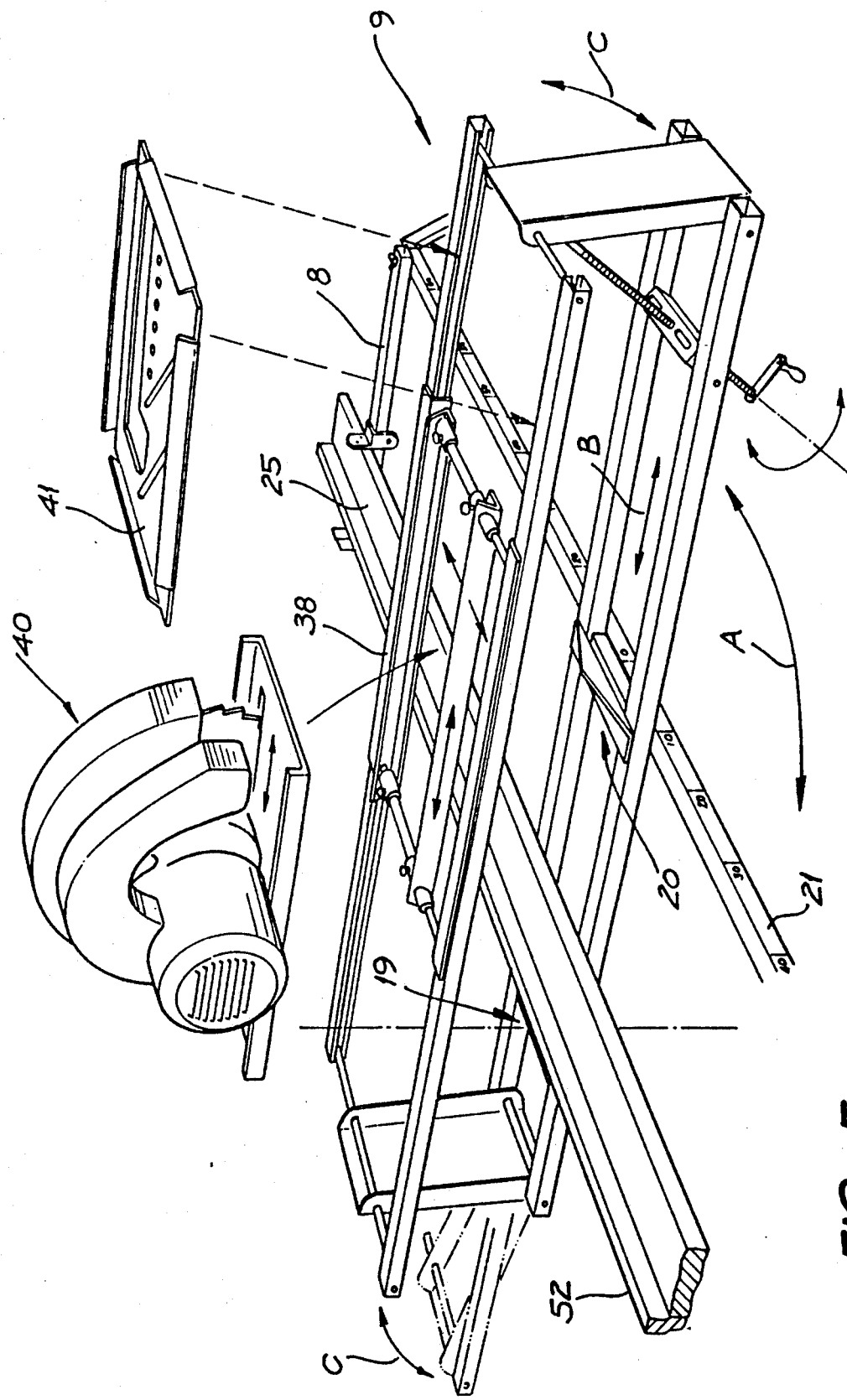
FIG. 5 is a further perspective view illustrating some detail of a power tool mounting carried by the parallelogram linkage of FIG. 4 and illustrating two alternate mounting arrangements.

The general arrangement of the parallelogram frame 9, support frame 8 and support guide 25 are illustrated in FIG. 5. In this connection it will be appreciated that the frame 9 pivots about the rear releasable clamp 19 in the direction indicated by arrow A in FIG. 5. The operation of clamp 20 sets the angle between the lower rails 30 and front cross-member 21 thereby determining the angle between the support frame 8 and parallelogram frame 9.

A thumbscrew 20A is located on the clamp 20 for locking only the angle setting thus allowing the frame 9 to freely slide longitudinally while secured at the set angle for an extended range to the length of cut, and clamps 19 and 20 are able to lock the frame 9 at any required longitudinal position.

It will be appreciated that the thumbscrew 20A is primarily for securing only the angle while the clamps 19 and 20 fix not only the angle of the parallelogram frame 9 relative to the base frame 8 but longitudinal location as well. The clamps 19, 20 are so arranged as to permit longitudinal sliding motion of the lower rails 30 relative to the front cross-member 21 in the direction of arrow B. In this way, the entire parallelogram frame 9 can be longitudinally and angularly reciprocated relative to the base support frame 8. Rotation of handle 35 raises or lowers the upper rails 31 and carriage 3 as indicated by broken lines and arrows C in FIG. 5.

Figure 6:
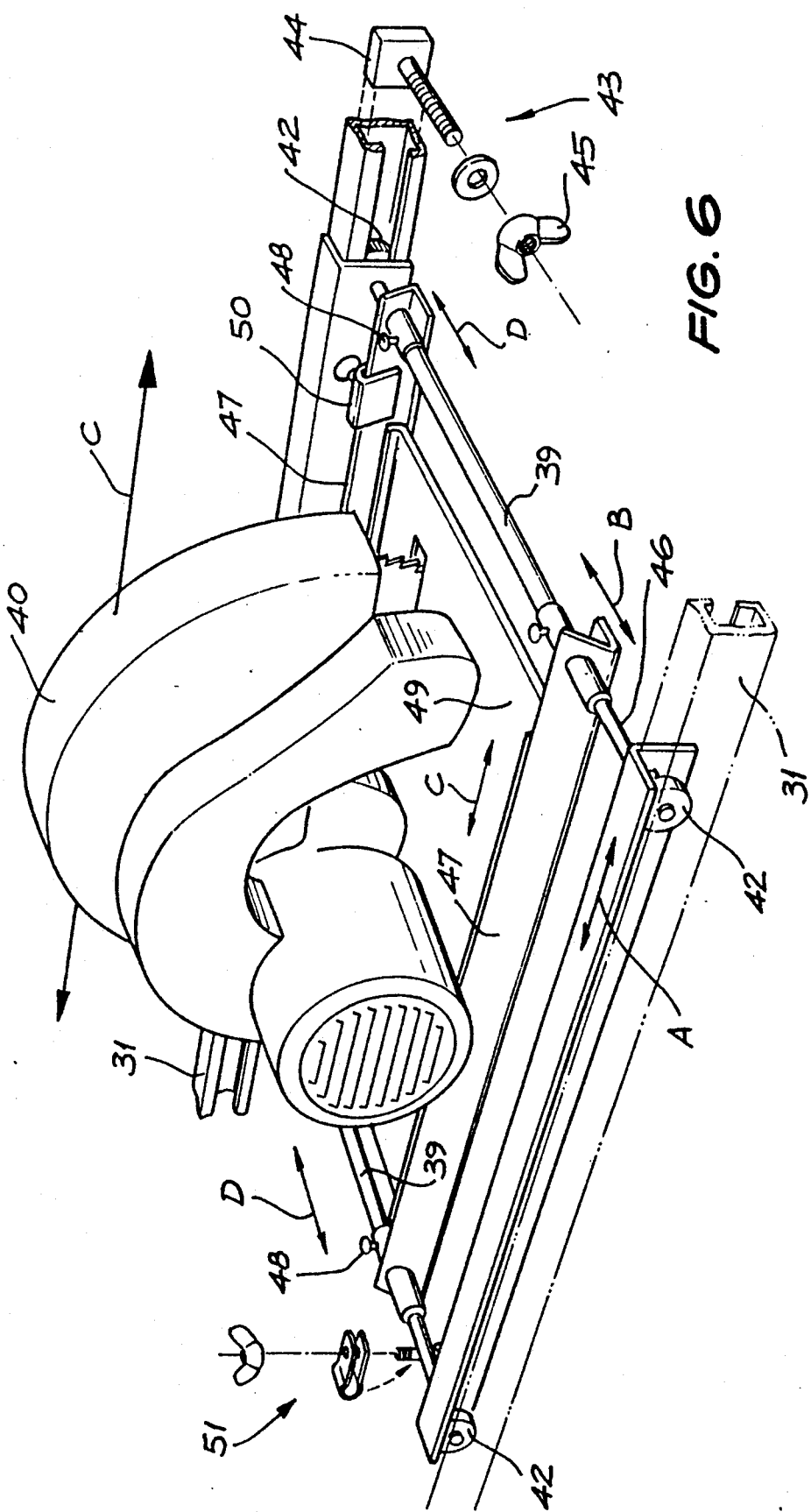
FIG. 6 is a perspective view of a first mounting arrangement.
Figure 6A:
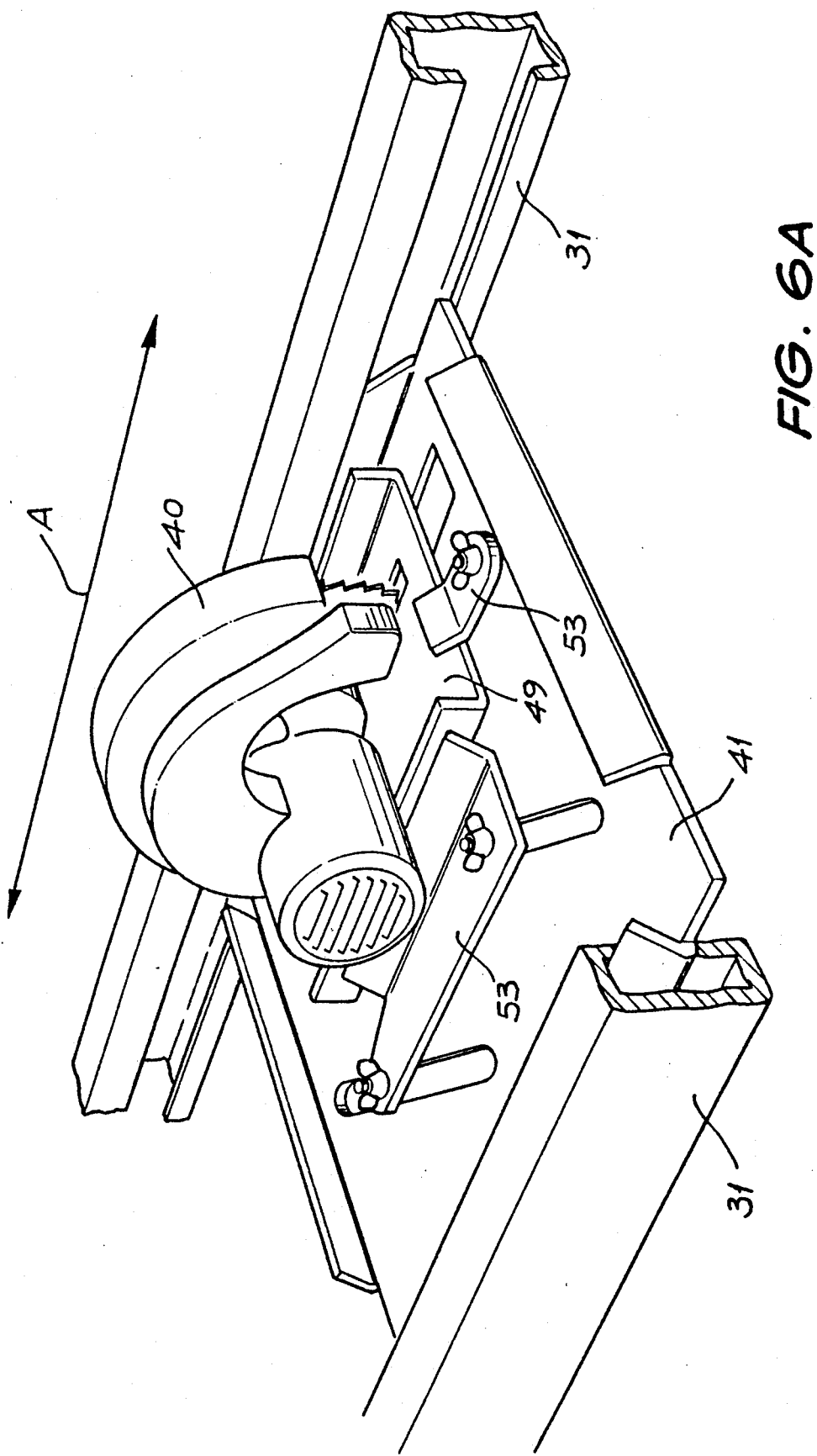
FIG. 6A is a perspective view of a second mounting arrangement.

As also indicated in FIG. 5, a circular saw 40 or base plate 41 can be mounted into the carriage 38 or directly into the tracks 31 and the details of these alternative arrangements are respectively illustrated in FIGS. 6 and 6A.

As seen in FIG. 6, the carriage 38 is provided with wheels 42 (or equivalent arrangement such as slides or bearings) which enable the entire carriage 38 to be slid backwards and forwards along the upper rails 31 in the direction of arrow A within predetermined limits able to be set by means of four stops 43 only one of which is illustrated. In this connection it will be appreciated that the upper rails 31 have a C-shaped configuration and the stops 43 each comprise a block 44 located within the rail 31 and a fastener 45 which clamps the block 44 against the rails 31 and thereby determines its position. These stops each have a thumbscrew with a threaded end protruding adjustably so the carriages limited travel can be micro-adjusted.

In addition to the front to rear movement along the rails 31, the carriage 38 is also provided with a pair of transverse rods 46 which form the axles for the wheels 42. Located on each transverse rod 46 and slidable therealong is a corresponding sleeve 39. A pair of V-shaped members 47 extend longitudinally between the sleeves 39. The V-shaped members 47 are slidably adjustable in the direction of arrow b along the sleeves 39. Thumbscrews 48 enable the position of the V-shaped members 47 to be set so as to grasp but not clamp the base plate 49 of the circular saw 40 and wing-nuts on threaded rods (not illustrated) are adjusted to secure the setting. Similarly, the V-shaped members 47 each carry a pair of U-shaped stops 50 (only one of which is illustrated) which determine the extent of the longitudinal sliding movement in the direction of arrows C of the base plate 49 within the V-shaped members 47. Finally, two C-shaped stops 51 (only one of which is illustrated) are provided on the transverse rods 46 so as to limit the left and right movement in the direction of arrows D of the sleeves 39 (and hence the V-shaped members 47) along the transverse rods 46.

In an alternative to the C-shaped stops 51 there are provided, but not illustrated, plastic nuts (which self lock) on threaded cross-rods 46.

FIG. 6A illustrates an alternative arrangement in which a base plate 41 is carried directly by the upper rails 31 and is slidable therealong in the direction of arrow A. Clamps 52 are provided in order to enable the base plate 49 of the circular saw 40 to be secured to the base plate 41. As best seen in FIG. 5, the base plate 41 is provided with various apertures and slots in order to accommodate various different types of power tools.

The operation of the apparatus as thus far described, as a guiding and control apparatus for work from above power tools, will now be described.

As best seen in FIG. 5, the workpiece to be cut (not illustrated) is placed on the support guide 25 and pushed rearwardly so as to be in abutment with the rear lip or fence 52 thereof. The intended angle of cut is set by adjustment of releasable clamp 20 or by thumbscrew 20A if cross location setting is required. When set, then lock with clamps 19 & 20. The depth of cut is set by turning the handle 35 so as to variably control the height of the upper rail 31 relative to the workpiece as necessary. For bevel cutting simply use the saw's own adjustment and rotate handle as to reset the depth of cut. The cut is then made by sliding the carriage 38 along the upper rails 31. Where the power tool is a router or a circular saw fitted with a cutter rather than a sawblade, instead of a narrow cut being formed in the workpiece, it is often desired to form a groove of substantial width. This can be done in a number of strokes by moving the carriage 38 from front to rear and with each stroke moving the carriage 38 sideways by sliding the sleeves 39 and hence the machine tool by a small increment corresponding to the width of the cutter. The various stops 43, 50 and 51 can be set so as to determine the length and width of the groove with repeatable accuracy. These stops can be adjustably screwed to increase accuracy and speed of set up.

It should be appreciated if a drill press were used in this manner a rectangularly adjustable pattern of up to four holes can be drilled and by use of the distance locating device (described later) can of course, be repeated at predetermined spacings.

The conversion of the apparatus from its work from above to its work from below configuration will now be described with reference to FIGS. 7 and 8. With the circular saw 40 still mounted in the carriage 38, the lower pin 54 of the linkage 32 is removed thereby enabling the entire upper rails 31 to be pivoted in a vertical plane about the linkage 33 from the position illustrated in FIGS. 5 and 7 into the position illustrated by broken lines in FIG. 8. The linkage 32 is then relocated in the case 2 to reinstate the variable screw height control of the parallelogram 9 with the machine tool 40 inverted but without the interconnection of the lower rails.

Figure 8:
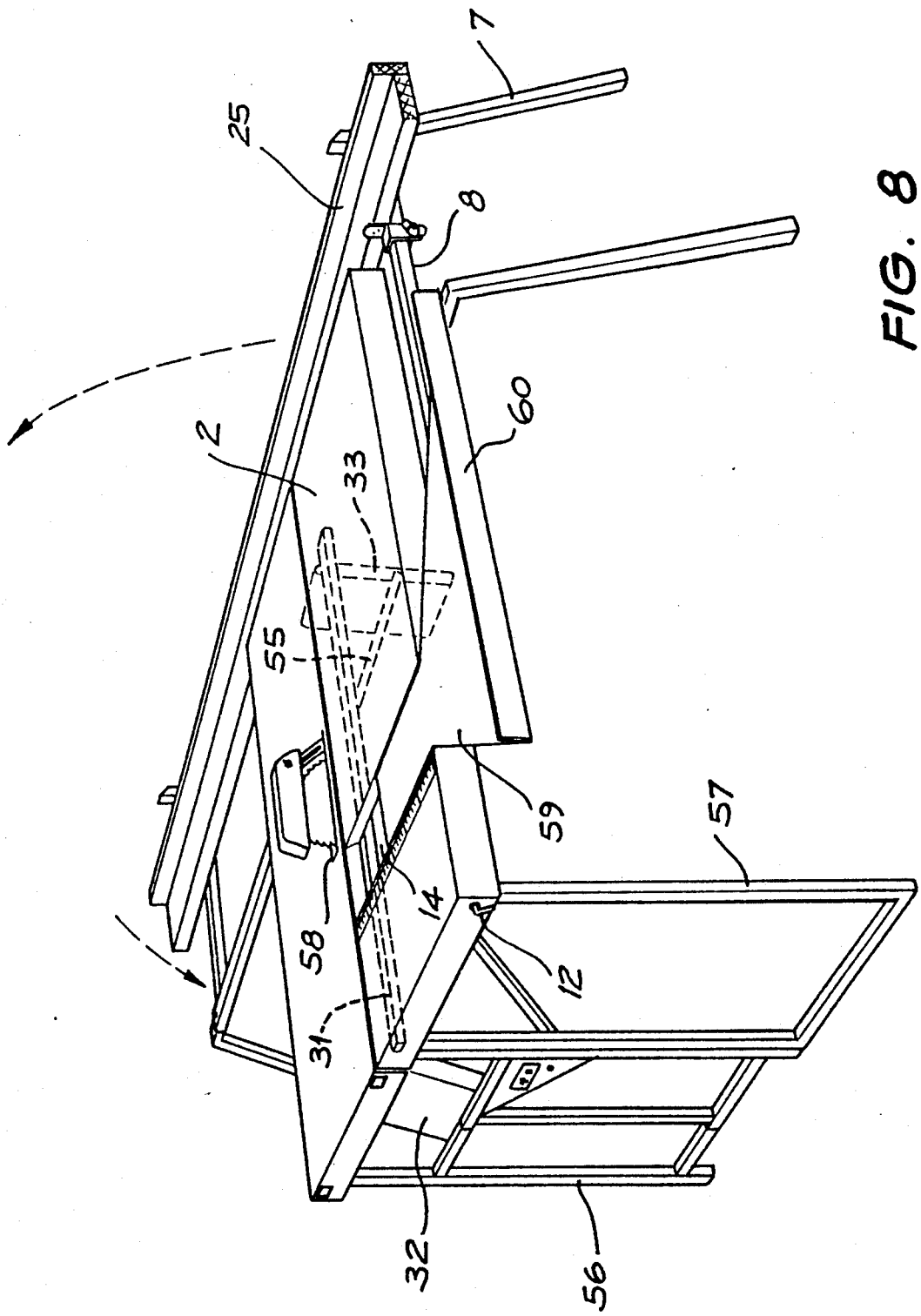
FIG. 8 is a schematic perspective view of the apparatus in the work from below configurations.

As also illustrated by broken lines in FIG. 8, a cross brace 55 is interconnected between the upper carriage 38 and a point intermediate the ends of linkage 33. In this way, operation of the handle 35 still raises and lowers the position of the upper rails but the carriage 38 slides along the upper rails 31 so that the saw 40 moves substantially vertically rather than moving in an arc which would be the case if the carriage 38 were fixed to the upper rails 31.

Alternatively, brace 55 may be replaced by a vertical peg held fixed relative to the table as a whole and closely fitted into a guide hole fixed to the carriage 38. As the carriage 38 is raised or lowered it will slide up or down the peg thus maintaining its position relative to the table.

Not shown in the drawings is an alternative inversion arrangement which includes two pairs of openings in the upper surface of the rails 31. The openings of each pair are aligned across the frame 9 and each pair of openings is positioned at a respective end of travel of the carriage 38 within the rails 31, thus providing the openings in each of the four corners of travel of the carriage 38. The openings are sized to allow the wheels 42 to pass through the openings. To invert the carriage 38 it is slid to one end of its travel in the rails 31 and the pair of wheels 42 at that end are aligned with the openings, raised out through the openings, thence swung, with the carriage 32, 180° about the pair of wheels 42 remaining in the rails 31 and finally dropped back into the rails 31 through the opposite end openings.

It will be appreciated that out of the case 2 are folded two prop frames 56 and 57 which support the respective ends of the case 2 remote from the support frame 8. The end of the case 2 adjacent the support frame 8 is secured to the front cross member 21 by means of the support plate 15 (FIG. 2). The circular saw 40 which is now upside down, protrudes through an aperture 58 in the case 2 and is therefore able to cut from below a workpiece positioned on the upper surface of the case 2. This mode of cutting is particularly suited to the ripping of long pieces of timber in the direction of the grain.

In an alternative embodiment not illustrated a single side of the carry case 2 is used as the cutting table.

As seen in FIG. 8, in order to support such cutting action, an L-shaped support guide 59 is able to be mated with the transverse guide 14 so as to set the distance between the blade of the circular saw 40 and the upturned lip 60 of the support guide 59.

As seen in FIG. 9, the support guide 60 is reversible so as to locate the lip 60 closely adjacent to the cutting blade of the circular saw 40, if desired. This reversal and sliding action are brought about by the dovetail shape of the guide 14 and the corresponding attachments (FIG. 9) to the support guide 59. The guide 14 has an inner male section that is able to slide telescopically and lock (method of locking not shown) to extend the range of width between the upturned lip 60 and saw blade 40. Operation of the handle 12 rotates the shaft 11 (FIG. 2) so as to release or clamp the locking cam 10 thereby fixing the support guide 59 at any predetermined position.

The support guide 59 has a slot 65 for viewing an embedded rule 66 in the table/benchtop, by placing the lip 60 against the sawblade 40 and then marking on part 59 the position of "0" read from the rule all measurements can then be read directly at that mark. When used with part 59 reversibly inverted a second mark is made at slot 67 at a point corresponding where an addition of for example 500 mm when added to the indicated measure gives the correct distance of setting from sawblade 40 to fence 60.

Turning now to FIG. 9, the case 2 is also provided with a slide out L-shaped support 63 which enables long and/or wide pieces of timber 64 (illustrated in phantom) to be guided and supported during what would normally be the cross cutting operation. An L-profiled fence 61 is pivotally mounted on the support 63 at pivot 62. The fence 61 is used to control the angle of the cut. For example if the fence 61 is pivoted at an angle to the circular saw this enables the fence 61 to be used as a guide along which a straight edge of a piece of timber to be cut can be held so as to enable the saw blade to cut the timber at a predetermined angle relative to that straight edge. If desired a stop (not illustrated) can be secured to the fence 61 to determine the length of a piece of timber to be cut when multiple lengths are required each with a set angle. This is particularly suited to cutting large panels to length and/or angle when required.

FIGS. 10 and 10A illustrate how the apparatus of the preferred embodiment in its work from above configuration can be used to cut out, for example the side support beams, or stringers, of a staircase. The righthand stringer is illustrated being cut in FIG. 10 and the lefthand stringer is illustrated being cut in FIG. 11. Located on the upper rails 31 is a template 72 through which the cutter or bit of a router (not illustrated) is passed. The template 72 is shaped so as to produce the desired shape or trench housing 73 in the stringers 70, 71 to accommodate the treads and rises of the staircase. In each instance, the parallelogram frame 9 is turned relative the support frame 8 to align the template profile at the intended angle of descent of the staircase. Each trench housing 73 is then routed in turn with the template 72 being maintained stationary above the stringer 70. As each trench housing 73 is in turn cut, the stringer is then moved longitudinally along the support frame 8 and the next trench housing 73 is cut. In FIG. 10, the trench housings 73 are commenced at the righthand end of the stringer 70 and the stringer 70 is moved from left to right as seen in the drawing whilst in FIG. 10A, the trench housings 73 are commenced at the lefthand end of the stringer 71 and the stringer 71 is moved from right to left as seen in the drawing. It will be appreciated by those skilled in the art that the above described arrangement enables the right and left hand stringers 70, 71 of the staircase to exactly match and the long length of the parallelogram frame 9 enables the angle at which the parallelogram frame 9 is set relative to the support frame 8 to be determined with considerable accuracy. The result is an accurate job which is able to be accomplished in a short time with considerable ease.

Figure 11:
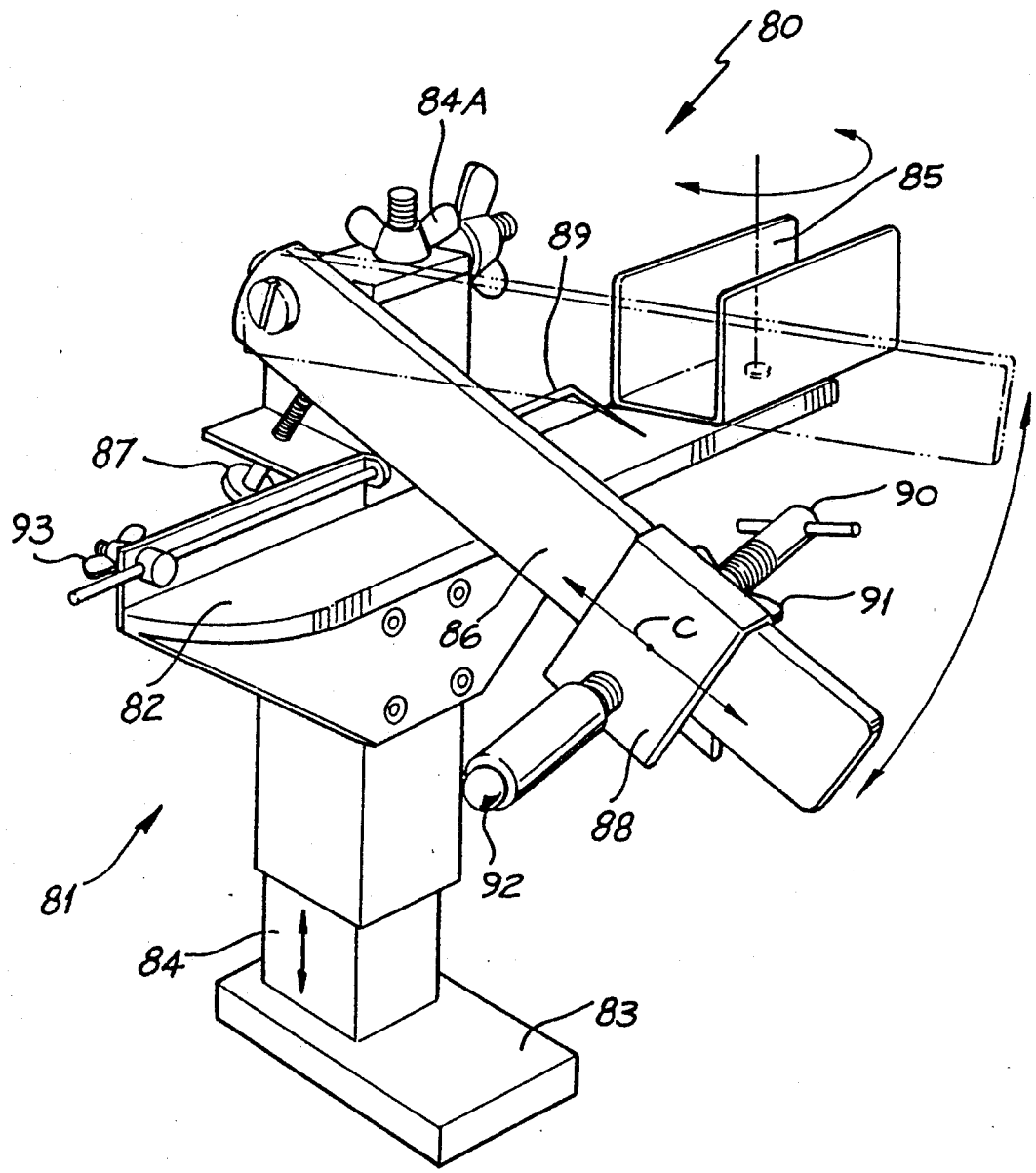
FIG. 11 is a perspective view of distance locating device.

FIG. 11 illustrates a distance locating device 80 able to be secured to the workpiece support guide 25 by means of a clamp 81 formed from L-shaped flange 82 and a plate 83 mounted on a slidable central rod 84. The distance between the lower surface of the flange 82 and the upper surface of the plate 83 is governed by a central threaded bar connected to the rod 84 and which carries a wing nut 84A. A tape measure receiving bracket 85 is also located on the flange 82.

Pivotally mounted at the top of the device 80 is an arm 86 which can be swung through the positions illustrated by broken lines in FIG. 11 with the lowered position being adjustably set by the screw 87. Slidably and adjustably mounted on the arm 86 is a bridle 88 through which a threaded bar 90 is screwed on a substantially downward angle.

A wing nut 91 releasably locks the bridle 88 and threaded bar 90 at any desired position along the arm 86. The threaded bar 90 (when released) is able to be rotated to determine precisely the distance between the point 92 of the bar and the operative member of the power tool.

A fine saw cut is placed at say, any point along the fence of the workpiece support at a distance from the cutter of the power tool not exceeding the distance between the point 92 and the cursor 89. In the described embodiment of FIG. 13 this is approx. 150 mm. The tape's own hook is inserted into this saw cut and the main body of the tape measure is then clipped onto the receiving bracket 85 by it's own clip. The bracket 85 is rotatable to allow the attachment of "right-handed" and "left-handed" tapes. The adjustable cursor 89 is then set to indicate on the tape the measurement between the point 92 and the operative member of the power tool and locked with wing nut 93. Any discrepancy can be finely adjusted by rotation of the threaded bar 90. From then on any length can be rapidly selected and set by relocating the device 80 with the cursor 89 indicating upon the tape the precise length to be cut.

This same application of "referred" measure can also be applied for example, to the cutting of architraves of numerous and varying lengths with a mitre at each end requiring the measure of length to be taken from the "short corners" by simply relocating the tape's own hook an appropriate amount and then reading the length of cut indicated by the cursor on the tape.

Figure 12:
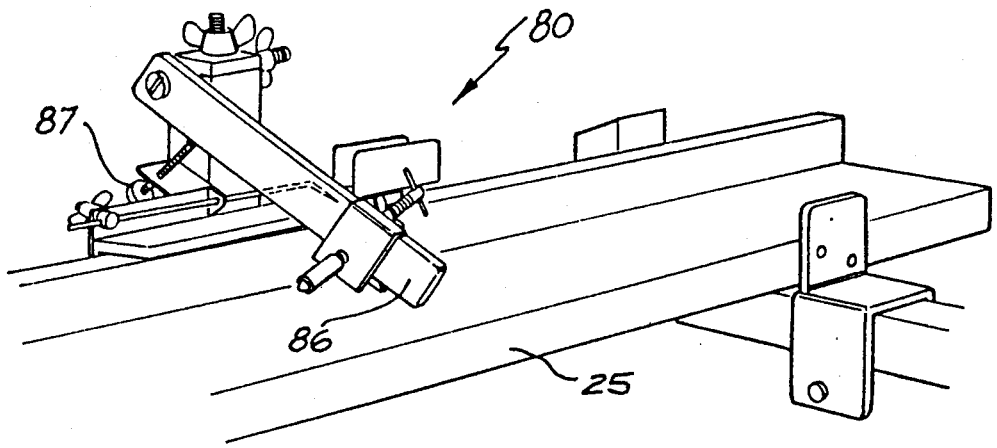
FIG. 12 is a perspective view showing the device of FIG. 11 clamped to the workpiece support guide.

FIG. 12 illustrates the device 80 clamped to the workpiece support guide 25. The bridle 88 with the bar 90 are set on the arm 86 in the operative position for use as a work length stop.

Figure 13:
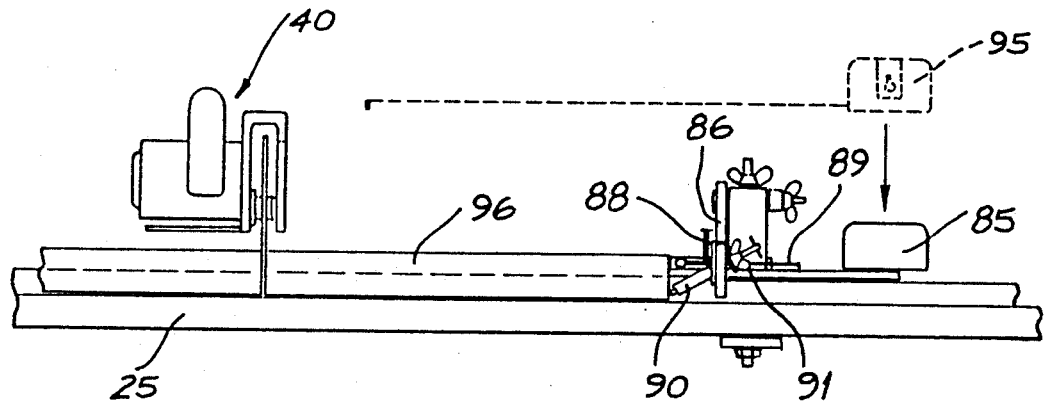
FIG. 13 is a front elevation showing one method of operation using the device of FIG. 11.

As illustrated in FIG. 13, in this configuration a conventional tape measure 95 can be clipped by its own clip (not illustrated) onto the bracket 85 and adjusted and then used in the manner previously described. This is particularly useful for rapid setup when cutting a number of pieces of material 96 at multiples of varying lengths from a long piece of stock material. Such cut to length material 96 for example being timber as required for the noggings of a timber framed wall.

Figure 14:
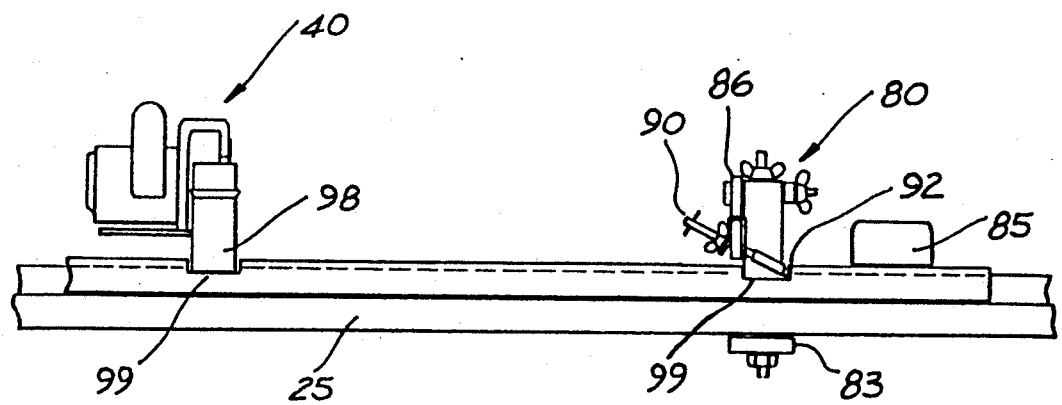
FIG. 14 is another front elevation showing another method of operating using the device of FIG. 11.

Finally FIG. 14 illustrates a method of using device 80 together with a power tool using a trenching head 98 to cut trenches 99 at a predetermined spacing from each other. In this use, the direction of the bar 90 is reversed by end inverting the bridle 88 and slidably setting it at the required position along arm 86 and at a suitable height by adjustment of screw 87. One trench is cut in the correct position, then, with the device 80 at the predetermined space from the trenching head 98, the work material, say a piece of timber is moved from left to right as seen in FIG. 14. The point 92 slides along the top of the timber until it drops into the cut trench 99. A short push to the left brings the point 92 into abutment with the right hand edge of the cut trench 99. Then the trenching head 98 is moved past the timber to cut the next trench 99. The timber is then again moved from left to right thereby bouncing the arm 86 (and hence point 92) out of the previously cut trench 99. The timber is moved further from left to right until the point 92 is located in the last cut trench 99, the next trench 99 is cut, and so on. This method is particularly useful in cutting trenches in wall plates for studs, for example.

This distance locating device provides the following benefits:

1. Provides a more efficient system of length selection that can be conveniently used with any standard measuring tape.
2. Has micro adjustable zero.

3. Can be quickly fitted to most sizes of material that are likely to be used as the fence of a workpiece support.

4. The location of the point 92 is infinitely adjustable and can be set so as to come into contact at any desired particular point on the end of the work material and at the same time remain clear of the workpiece support and guide fence, this feature virtually eliminates the need to constantly check for and clean away offcuts and sawdust that normally accumulate against the stop and affect accuracy. For example an aluminium extrusion of hollow section being cut to a work length stop would normally present such a problem.

5. When not in use the arm 86 can be flipped over out of the way, this feature is of great value if more than one stop is desired in use, with the body of the measuring tape attached at an extremity any number of these stops may be fitted to the fence being independently free to slide to any position indicated on the tape by their own cursor and be locked at that location with the arm 86 flipping over into or out of the operable position, thus, leaving a clear path when requiring to use a more remote preset stop at a further length of setting.

6. By end inverting the bridle 88 the device becomes an automatic trench locator having similar advantages as when used in the length stop mode.

7. Because of the adjustability of the bridle 88 and hence the threaded bar 90 means it can be used also for locating holes at repeated set spacings precisely and automatically.

8. In either mode the feature of "referred" measure read on the tape ensures the tape end is located at a safe distance from the operative member of the power tool.

The foregoing describes only one embodiment of the present invention and modifications or further uses, obvious to those skilled in the art, can be made thereto without departing from the scope of the present invention.

I claim:

1. A machine tool device including a workpiece support frame adapted to support a workpiece in a working plane, a machine tool support frame adapted to support an attached machine tool for relative longitudinal sliding movement parallel to the working plane, said machine tool support frame including a parallelogram linkage frame having a top portion providing said longitudinal sliding movement of said machine tool, a bottom portion being pivotally attached to the workpiece support frame about a pivot point at a first side of said workpiece support frame so that said machine tool support frame can be swung about the pivot point within the working plane, two end portions linking together, and maintaining parallel, the top portion and the bottom portion, and a height control screw mechanism connected to two parts of the parallelogram linkage frame by two screwdriven variably separate mechanism parts so as to adjustably set and fix the distance between the top and bottom portions.

2. A machine tool device as defined in claim 1 further including a machine tool carriage attached to the machine tool support frame in longitudinal sliding engagement therewith, said carriage being adapted to securely retain the machine tool.

3. A machine tool device as defined in claim 2 wherein said machine tool carriage is adapted to securely retain the machine tool in selectably fixed or relative longitudinal sliding engagement with said machine tool carriage.

4. A machine tool device as defined in claim 2 wherein said machine tool carriage is mounted to allow sliding transverse travel on transverse bars, traversable longitudinally of the machine tool support frame, including adjustment means that set the available distance of said sliding transverse travel whereby an attached machine tool is retained in independent transverse and longitudinal sliding engagement.

5. A machine tool device as defined in any one of the claims 1 to 4 further including a scale fixed to a second side of the workpiece support frame opposite said first side and a co-operative index moving with the machine tool support frame and indicating by alignment with markings on the scale a relative angle between the machine tool support frame and the workpiece support frame within the working plane.

6. A machine tool device as defined in any one of the claims 1 to 4 further including a scale in the form of a conventional protractor fixed to the workpiece support frame and centred on said pivot point and a co-operative index moving fixed to the machine tool support frame and indicating by alignment with markings on the scale a relative angle between the machine tool support frame and the workpiece support frame within the working plane.

7. A machine tool device as defined in any one of the claims 1 to 4 further including a scale being a conventional protractor fixed to the machine tool support frame and centred on said pivot point and a co-operative index fixed to the workpiece support frame against which markings on the scale indicate a relative angle between the machine tool support frame and the workpiece support frame within the working plane.

8. A machine tool device as defined in claim 2 wherein the machine tool support frame is in longitudinal linear sliding engagement with the workpiece support frame thereby being adapted to slide between a point beyond one side of the workpiece support frame and another point beyond an opposite side of the workpiece support frame.

9. A machine tool device as defined in claim 8 wherein the lower portion of the parallelogram frame is selectably slidable or fixed relative to a front clamp means secured adjustably along a front edge of said workpiece support frame.

10. A machined tool device as defined in claim 9 wherein said screw mechanism is non-parallel to the end portions and is linked between any two of said top portion, bottom portion and an end portion.

11. A machine tool device as defined in claim 10 wherein said height control screw mechanism is releasably attached to at least one of said two portions of the parallelogram frame to facilitate a rapid transition of said parallelogram linkage support frame to a substantially flat state for packing and/or storage of the parallelogram frame within a void formed in the work support frame.

12. A machine tool device as defined in claim 11, wherein one of said end portions is adapted to be disconnected from the lower portion so that the upper position and said one end portion are adapted to be integrally swung vertically through approximately 180° to an inverted configuration whereat said one end portion is connected to a point distance from the fixed relative to the lower portion.

13. A machine tool device as defined in claim 9 wherein the machine tool support frame further includes a pair of parallel spaced apart outer tracks constituting part of said upper portion retaining machine tool carriage bearing blocks or wheels providing linear movement of the carriage, wherein each of two opposite ends of each outer track include a cut-out section sized to allow removal of one end pair of said bearing blocks or wheels from the outer tracks via one end pair of said cut-out sections while remaining in attachment to said machine tool carriage whereby the machine tool carriage can be swung through 180° about an opposite end pair of said bearing blocks or wheels and said one end pair of said bearing blocks or wheels to be relocated within the outer tracks via an opposite end pair of cut-out sections thereby inverting a machine tool attached to said carriage.

* * * * *